(12) United States Patent
Walters et al.

(10) Patent No.: US 9,984,727 B2
(45) Date of Patent: May 29, 2018

(54) SYSTEM FOR PLAYING FILES ASSOCIATED WITH TAGGED INTEREST ITEMS

(71) Applicants: Bryant E. Walters, Centennial, CO (US); Brent C. Walters, Centennial, CO (US); Gregory Lee Walters, Aurora, CO (US); Jonathan A. Mai, Fort Collins, CO (US)

(72) Inventors: Bryant E. Walters, Centennial, CO (US); Brent C. Walters, Centennial, CO (US); Gregory Lee Walters, Aurora, CO (US); Jonathan A. Mai, Fort Collins, CO (US)

( * ) Notice: Subject to any disclaimer, the term of this patent is extended or adjusted under 35 U.S.C. 154(b) by 0 days. days.

(21) Appl. No.: 15/378,657

(22) Filed: Dec. 14, 2016

(65) Prior Publication Data
US 2017/0186465 A1    Jun. 29, 2017

Related U.S. Application Data

(60) Provisional application No. 62/387,315, filed on Dec. 23, 2015.

(51) Int. Cl.
*H04N 5/775* (2006.01)
*G11B 27/10* (2006.01)
(Continued)

(52) U.S. Cl.
CPC .............. *G11B 27/10* (2013.01); *G06F 3/165* (2013.01); *G06K 7/10297* (2013.01);
(Continued)

(58) Field of Classification Search
CPC .............. G11B 27/10; H04N 21/8106; H04N 21/41407; G06F 3/165; G06K 7/10386
(Continued)

(56) References Cited

U.S. PATENT DOCUMENTS 7,126,481 B2    10/2006    Vesikivi et al.
7,363,035 B2    4/2008    Reilly
(Continued)

FOREIGN PATENT DOCUMENTS

WO    2015081063 A1    6/2015

*Primary Examiner* — Thai Tran
*Assistant Examiner* — Jose Mesa
(74) *Attorney, Agent, or Firm* — James A. Sheridan; Sheridan Law, LLC

(57) ABSTRACT

The application provides an electronic tagging and playback system and methods of use for displaying files associated with tagged interest items. System embodiments may comprise an electronic tag storing a tag ID and disposed on at least one user interest item. A communications device may have a tag scanner in communication with a playback application activatable by the user for retrieving the tag ID when the tag scanner is in a proximity zone of the tag. A playback database may link to the playback application and may contain a playback file associated with the tag ID. The user may upload the playback file for a number of purposes, including memory enhancement, displaying a reminder, and/or assisting with language learning. The playback file may be any appropriate file displayed by the communication device when the playback application is activated and after the tag ID has been retrieved. Other embodiments are disclosed.

20 Claims, 16 Drawing Sheets

(51) Int. Cl.
  *H04N 21/81* (2011.01)
  *H04N 21/414* (2011.01)
  *G06F 3/16* (2006.01)
  *G06K 7/10* (2006.01)
  *H04N 5/91* (2006.01)
(52) U.S. Cl.
  CPC .......... *G06K 7/10386* (2013.01); *H04N 5/91* (2013.01); *H04N 21/41407* (2013.01); *H04N 21/8106* (2013.01)
(58) Field of Classification Search
  USPC ........................................................ 386/230
  See application file for complete search history.

(56) References Cited

U.S. PATENT DOCUMENTS

| | | | |
|---|---|---|---|
| 7,433,649 B2 | 10/2008 | Toulis et al. | |
| 7,756,467 B2 | 7/2010 | Bent et al. | |
| 8,350,675 B2 | 1/2013 | Riechel | |
| 8,418,918 B2 | 4/2013 | Saunders et al. | |
| 8,599,023 B2 | 12/2013 | Leggett, Jr. et al. | |
| 9,071,287 B2 | 6/2015 | Siddiqui | |
| 9,117,128 B2 | 8/2015 | Mats et al. | |
| 9,165,233 B2 | 10/2015 | Testanero | |
| 2006/0111902 A1* | 5/2006 | Julia | G09B 5/06 704/236 |
| 2006/0267731 A1 | 11/2006 | Chen | |
| 2007/0204374 A1* | 9/2007 | Bier | A41B 3/06 2/60 |
| 2007/0288499 A1 | 12/2007 | Dunko | |
| 2008/0097805 A1 | 4/2008 | Wells | |
| 2009/0024584 A1 | 1/2009 | Dharap et al. | |
| 2009/0064241 A1* | 3/2009 | Fellenstein | G11B 27/329 725/87 |
| 2012/0123827 A1 | 5/2012 | Dooley et al. | |
| 2012/0209896 A1* | 8/2012 | Raymond | G06F 17/30194 707/827 |
| 2012/0295542 A1 | 11/2012 | Telemi | |
| 2012/0310757 A1* | 12/2012 | Kim | G06Q 20/20 705/17 |
| 2013/0181819 A1 | 7/2013 | McLaren | |
| 2014/0113549 A1 | 4/2014 | Beg et al. | |
| 2014/0134946 A1 | 5/2014 | Testanero | |
| 2014/0149529 A1 | 5/2014 | McLellan et al. | |
| 2014/0313542 A1 | 10/2014 | Benchorin et al. | |
| 2014/0325048 A1 | 10/2014 | Benchorin et al. | |
| 2015/0130593 A1 | 5/2015 | Mats et al. | |
| 2015/0156266 A1 | 6/2015 | Gupta | |
| 2015/0302234 A1 | 10/2015 | Mats et al. | |

* cited by examiner

US 9,984,727 B2

SYSTEM FOR PLAYING FILES ASSOCIATED WITH TAGGED INTEREST ITEMS

REFERENCE TO PENDING PRIOR PATENT APPLICATION

This application claims the benefit under 35 U.S.C. 119(e) of U.S. Provisional Patent Application No. 62/387,315, filed Dec. 23, 2015 by Bryant E. Walters, Brent C. Walters, Gregory Lee Walters, and Jonathan A. Mai, for "MEMORY ENHANCEMENT SYSTEM FOR PLAYING FILES ASSOCIATED WITH TAGGED PERSONAL ITEMS," which patent application is hereby incorporated herein by reference.

BACKGROUND

RFID systems comprise an RFID tag and an RFID reader retrieving a tag ID stored in the RFID tag, the reader being sometimes linked to a database for uploading the location or presence of the tagged item. The RFID tag may be a passive or active transponder transmitting a tag ID when the tag is stimulated by the electromagnetic field emitted by the RFID reader. Inexpensive passive tags usually operate at 134 kHz or 13.56 MHz within a proximity measured in inches. RFID systems are generally used to check out library books, to track pallets of parts being shipped, or to track livestock location or behaviors. For example, an RFID system may track animal location or a manufacturing pallet location and may upload data describing the item, date, and location to a central tracking database and/or display the item ID to the user. Unfortunately, RFID systems such as these are generally 'one way' and may not download centrally-stored data about the item to the user, such as the health history of the animal being identified.

A library book RFID system may include a download of data which may involve recording the selection of a tagged library book, associating its tag ID with a bar code library card of a user for checking out a library book, and printing out a receipt identifying the book, user, and due date. Unfortunately, although the library system downloads the data association of 'book and user', the system does not download and display centrally-stored files relating to the item and designated by the user, thus limiting the usefulness of such systems to non-personal applications.

In another scenario, an inventory control system may allow a user to scan a tagged item and send a tag ID to a central database, and then may download and display stock or pricing info related to the item and its supplier(s) to the user. Unfortunately, although the inventory system may download centrally-stored data associations of 'item and supplier', the system does not download and display files relating to the item and designated by the user, such as personal files.

In another example, the user in an electronic shopping system may scan a tagged item and the system may download and display pricing related to the item and its supplier(s) to a shopper. The scanned item may be added to a personal shopping list of the user. The electronic shopping system may also incentivize the shopper based on a personal shopping history by offering discounts or coupons. However, the shopping system may not download and display personal files related to the item AND designated by the user. All of the above systems are impersonal and relate to the tracking of large volumes of commercial commodities or public items.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

One embodiment provides an electronic tagging and playback system for displaying playback files associated with tagged interest items. The system may include an electronic tag storing a wirelessly accessible tag ID and disposed upon at least one interest item of a user. The system may also include a communications device having a tag scanner associated with a playback application that is activatable by the user for retrieving the tag ID when the tag scanner is within a proximity zone of the electronic tag, as well as a playback database communicatively linked to the playback application and storing a playback file associated with the tag ID. The playback file may be uploaded to the playback database by the user via the playback application, and the playback file may include one or more media components displayed by the communications device when the playback application is activated and after the tag ID has been retrieved.

Another embodiment provides a method for displaying information associated with tagged items of interest. The method may include (1) disposing, upon an interest item of a user, an electronic tag having a wirelessly accessible tag ID stored within the electronic tag; (2) initiating a playback application installed upon a communications device, the playback application in communication with a tag scanner configured to activate the electronic tag within a proximity zone of the tag scanner; (3) using the playback application, storing a playback file in a playback database in communication with the playback application, the playback file associated with the tag ID; (4) activating the tag scanner; (5) retrieving the tag ID from the electronic tag; (6) receiving, from the playback database, the playback file; and (7) displaying, via a graphical user interface of the playback application, the playback file to the user.

Yet another embodiment provides a method for displaying information associated with items of interest to a user. The method may include (1) storing, within a playback database in communication with a playback application installed upon a user communication device having a tag scanner, a playback file associated with a wirelessly accessible tag ID stored on an RFID tag, the RFID tag attached to a user interest item; (2) detecting, via the tag scanner when the tag scanner and the RFID tag are both located within a proximity zone, the tag ID stored on the RFID tag; (3) in response to the detecting, retrieving the playback file from the playback database; and (4) displaying, via a graphical user interface of the playback application, the playback file to the user.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which.

DETAILED DESCRIPTION

Figure 1:
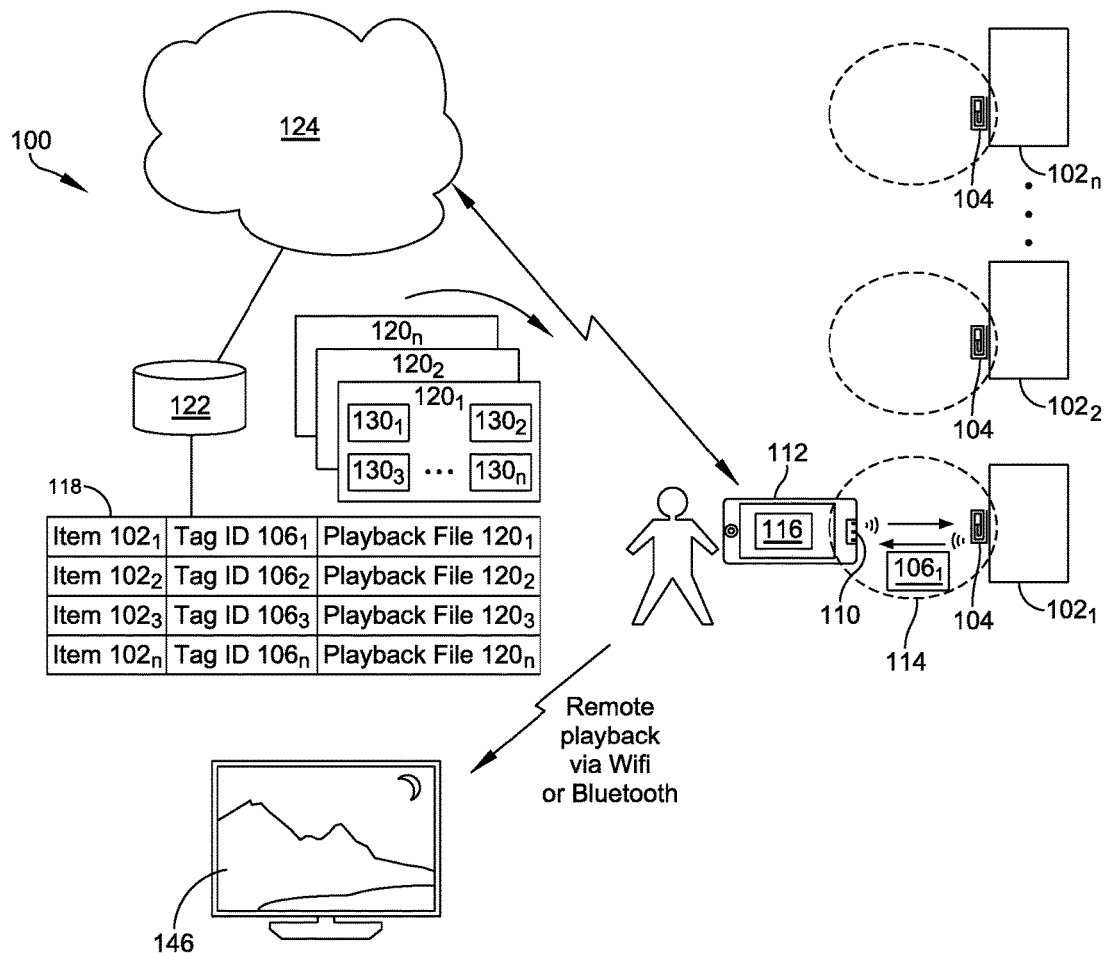
FIG. 1 provides a functional schematic showing a system architecture of one embodiment of an electronic tagging and playback system.

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

Overview

Because "one-way" type RFID tracking systems, discussed above, lack the ability to both receive and store data that is associated with a tag by a user and then output the associated data for viewing by either the inputting user or another, there exists a need in the art for an electronic tagging and playback system that receives, stores, downloads, and displays playback files related to or associated with tagged items of interest, as designated by the user, where the tags may be applied to any portion of the tagged item, whether visible or hidden from view. There also exists a need for a tagging system having a tag reader that downloads and displays the playback files (e.g., audio files, video files, voice files, PDF files, data files, or other types of display files) associated with the tagged item being scanned. Further, there exists a need in the art for a tagging system that displays the playback files as categorized by a number of operational playback modes, including, for example, a nostalgia mode, in which the personal files associated with the tagged interest item enhance a personal memory of the user; a language-learning mode, in which the files associated with the tagged interest item provide an alternate-language equivalent to promote learning a foreign language; and/or a reminder mode, in which the files associated with the tagged item provide information about to-do items or other information a user may need to remember. There also exists a need for variable detection modes in which the tag reader is able to operate in discrete detection mode to detect one tag at a time or continuous detection mode, in which the tag reader is able to automatically detect tags (associated with one or more playback modes) that come within a proximity zone of the tag reader.

Exemplary Systems & Methods

When elements are referred to as being "connected," "coupled," or "linked," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc., that perform particular tasks or implement particular abstract data types. Typically, the functionality of the program modules may be combined or distributed as desired in various embodiments.

Figure 2:
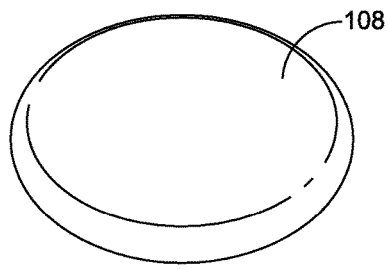
FIG. 2 illustrates one embodiment of a memory stone RFID tag for use with the electronic tagging and playback system of FIG. 1 to tag items of interest to a user.
Figure 3A:
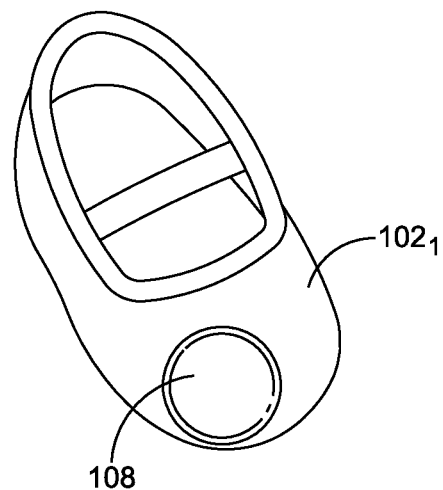
FIGS. 3A-3F illustrate perspective views of a number of exemplary interest items, each having the memory stone of FIG. 2 disposed thereupon.
Figure 3B:
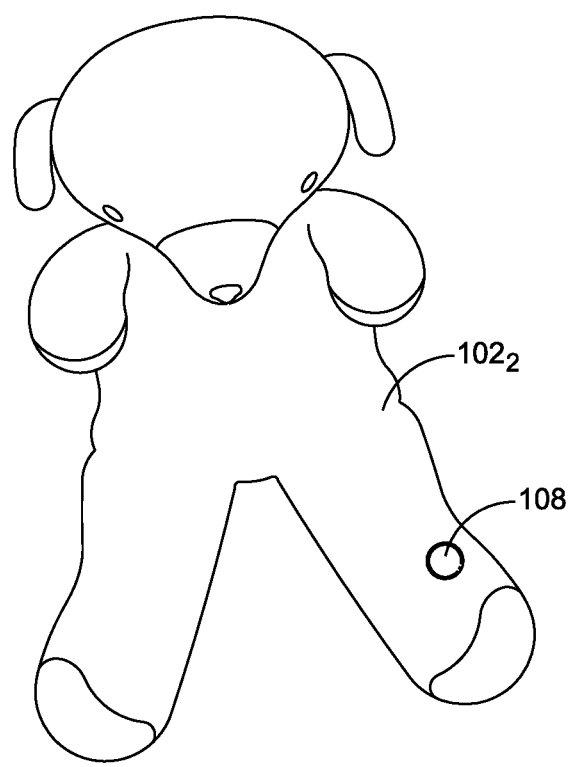
Figure 3C:
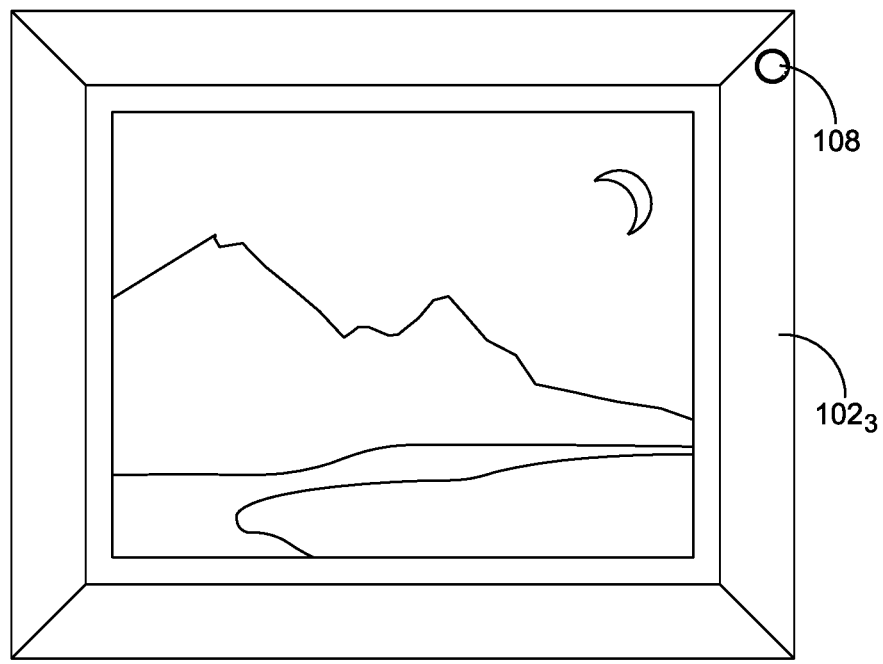
Figure 3D:
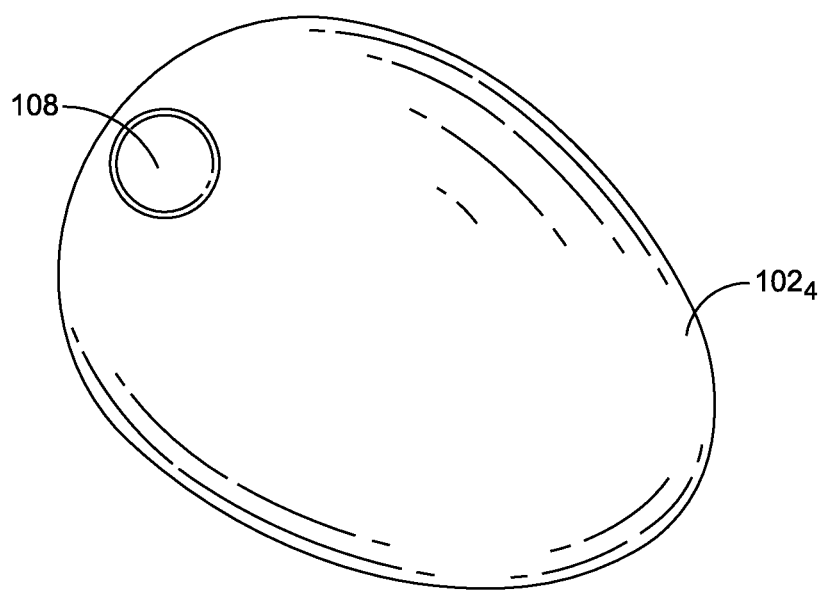
Figure 3E:
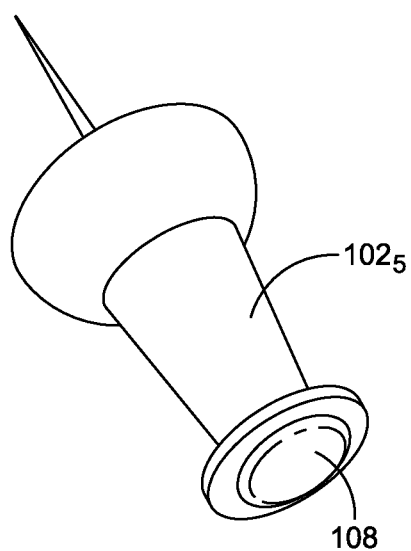
Figure 3F:
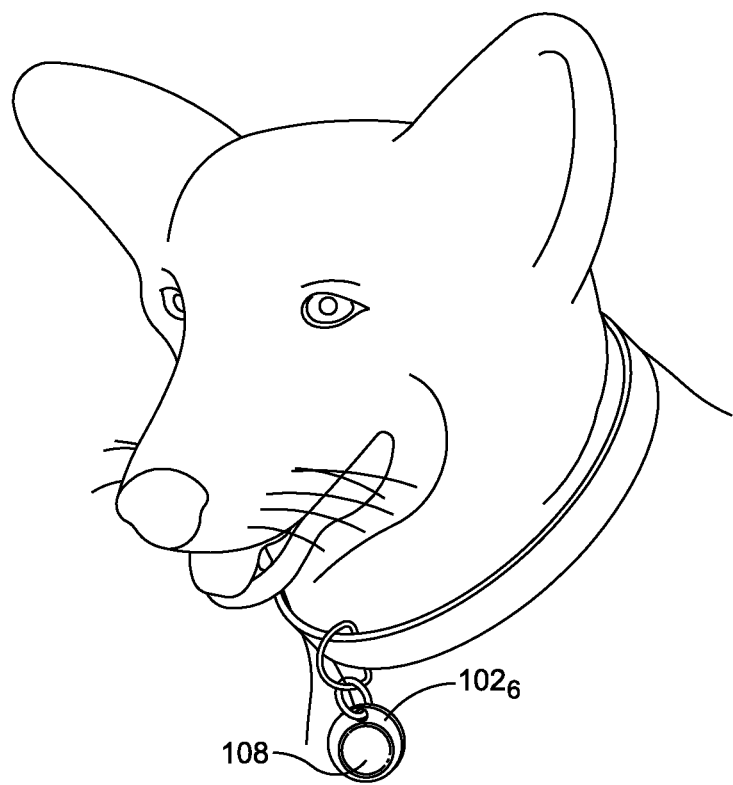

Turning to FIG. 1, one embodiment provides a personal tagging and playback system 100 for displaying playback files associated with tagged interest items. In this embodiment, personal tagging and playback system 100 may comprise a number of interest items $102_{1-n}$, each tagged with an electronic tag 104 storing a unique, wirelessly accessible tag ID $106_{1-n}$ that may be read by a tag scanner 110 within a mobile communications device 112, such as a smartphone, a tablet computer, a personal digital assistant, or another appropriate device. Electronic tag 104 may be, for example, an active or passive RFID tag, an active or passive near-field communications (NFC) tag, a bar code, or a QR code. In one embodiment shown in FIG. 2, electronic tag 104 may be a three-dimensional, adhesive-backed or otherwise attachable RFID memory stone 108. Memory stone 108 may incorporate wirelessly accessible tag ID $106_{1-n}$ and be configured for attachment to or association with any interest item $102_{1-n}$ identified by the user.

For example, and as shown in FIGS. 3A-3F, memory stone 108 may attach to plush items such as a pair of baby shoes $102_1$ or a stuffed teddy bear $102_2$, hard items such as a picture frame $102_3$, a stone knick-knack $102_4$, or a wall tack $102_5$, and/or even moving items such as a dog tag $102_6$ attached to a pet on the go. The types of interest items $102_{1-n}$ to which memory stone 108 may attach are nearly limitless, and memory stone 108 may attach to any point upon, about, or within the item.

Tag scanner 110 may read memory stone 108 when placed within a proximity zone 114 (FIG. 1) of electronic tag 104/memory stone 108, or the distance between tag reader 110 and electronic tag 104/memory stone 108 within which the electromagnetic emission of tag reader 110 successfully triggers memory stone 108 to transmit its tag ID $106_{1-n}$ to scanner 110. As a result, scanner 110 may retrieve tag ID $106_{1-n}$ from memory stone 108 when passed anywhere near the tagged interest item $102_{1-n}$, and memory stone 108 may be positioned at a visible location or portion of the item, or it may be hidden on a non-visible bottom, back, underside, or even inside of the item $102_{1-n}$. Mobile communications device 112 and tag scanner 110 need not come into visual contact with memory stone 108 in order to detect tag ID $106_{1-n}$.

Figure 4A:
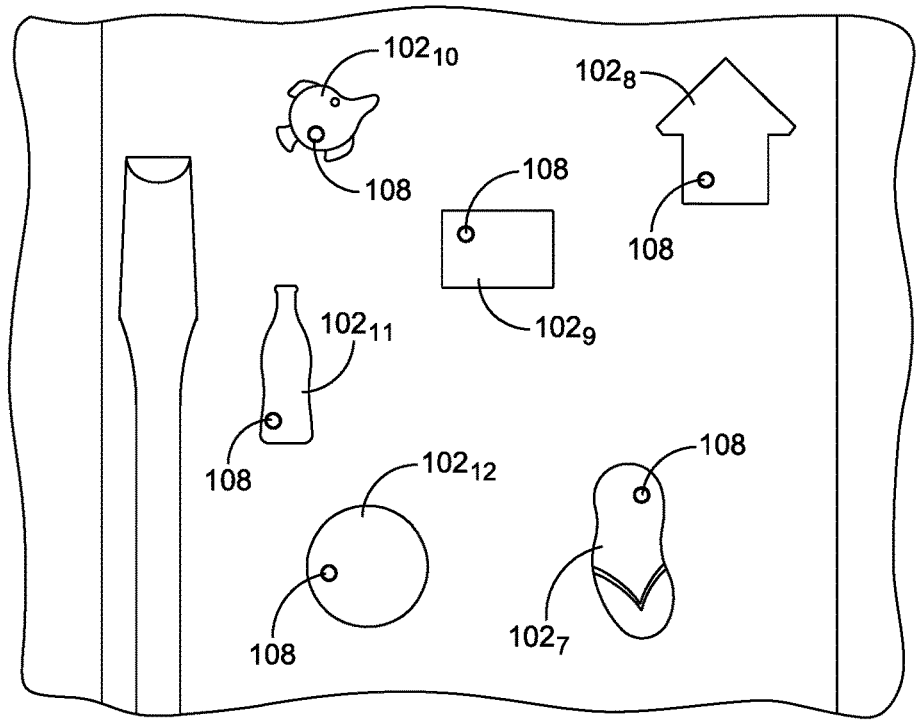
FIGS. 4A-4C illustrate exemplary use/tagging alternatives for the memory stone of FIG. 2.
Figure 4B:
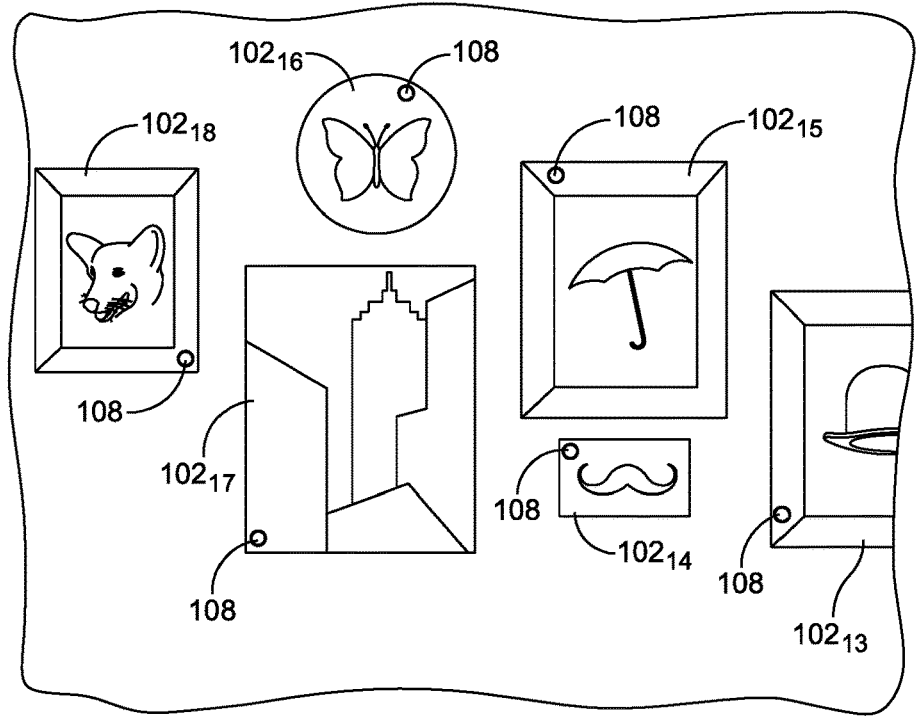
Figure 4C:
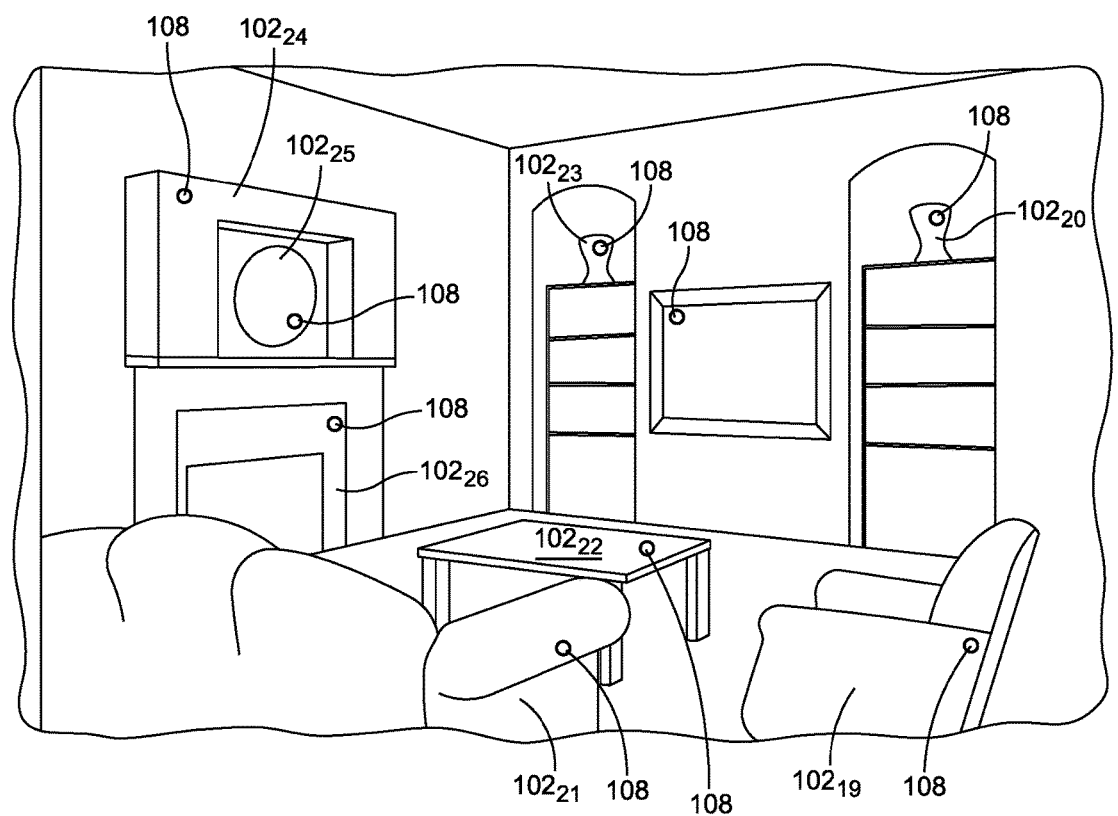

In addition, memory stones 108 may be placed within close proximity, such as upon crowded refrigerator magnets $102_{7-12}$ or a wall of framed pictures $102_{13-18}$, as shown in FIGS. 4A-B, respectively, because of small-item proximity and/or collision-avoidance algorithms built into the RFID or NFC systems that allow only one tag at a time to respond to an activating tag scanner. Alternatively, stones 108 may be spaced apart on a variety of interest items within a home, such as upon household items $102_{19-25}$ shown in FIG. 4C, or within an office, a tourist attraction such as a museum, or even outside.

Figure 5:
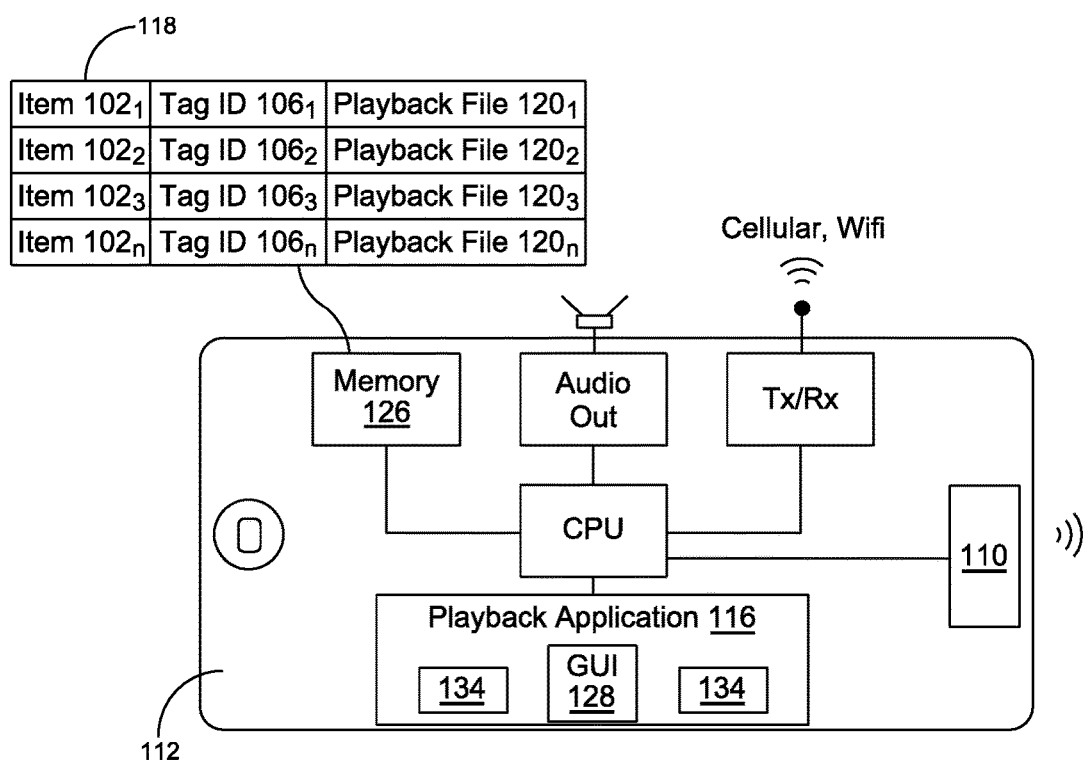
FIG. 5 illustrates one exemplary embodiment of a portable communications device for use with the electronic tagging and playback system of FIG. 1.

FIG. 5 illustrates a functional schematic of one embodiment of mobile communications device 112 (e.g., a smartphone). In this embodiment, mobile communications device 112 may feature a playback application 116, such as a Memory Stone application, that is in communication with tag scanner 110 and activatable by the user for retrieving tag ID $106_{1-n}$ when tag scanner 110 is within proximity zone 114 of electronic tag 104 (FIG. 1). Embodiments of tag scanner 110 may be an RFID reader, a NFC reader, a bar code reader, a QR code reader, and/or a digital camera, respectively. Mobile communications device 112 may employ NFC to read an RFID tag since NFC standards are based on RFID standards. For a passive tag, item proximity zone 114 may range from approximately 1 inch to approximately 18 inches. Active electronic RFID tags may possess a proximity zone of at least three feet.

Playback application 116 may be downloaded and installed upon mobile communications device 112 via a proprietary website or an application store such as Google Play or the Apple App Store and may include a graphical user interface (GUI) 128. GUI 128 may provide an interactive visual display for the user and allow the user to communicate with and operate application 116. Playback application 116 may also execute a number of functionality modules, discussed below, and link with a playback database 118, which may associate a playback file $120_{1-n}$ with tag ID $106_{1-n}$ and interest item $102_{1-n}$, respectively. For example, interest item $102_1$ may be associated with tag ID $106_1$ and playback file $120_1$, interest item $102_2$ may be associated with tag ID $106_2$ and playback file $120_2$, interest item $102_3$ may be associated with tag ID $106_3$ and playback file $120_3$, and so on. As shown in FIG. 5, one embodiment of playback database 118 may be stored in a memory 126 of mobile communications device 112. In another embodiment shown in FIG. 1, playback database 118 may be stored in a storage system 122 accessible via a wired or wireless communication channel via the Internet or a cloud computing system 124.

Returning to FIG. 1, playback file $120_{1-n}$ may include a number of media components $130_{1-n}$ such as, for example, one or more audio files, video files, PDF files, data files, or any other type of files for display or playback by mobile communications device 112 upon GUI 128 when playback application 116 is activated and after tag ID $106_{1-n}$ has been retrieved/identified by tag scanner 110. In one embodiment, Wifi or Bluetooth capabilities may be leveraged to mirror playback file $120_{1-n}$ upon other devices such that playback file $120_{1-n}$ may be routed to a device external to the communications device 112, such as a smart television 146, an iPad, or any other appropriate device for display in addition to or in lieu of display upon communications device 112 or tag scanner 110.

In addition, when playback file $120_{1-n}$ is created, as detailed below, the user may designate or associate playback file $120_{1-n}$ with one or more playback operational "modes" such as, for example, nostalgia or memory-enhancement mode, reminder mode, or language-learning mode.

In one embodiment, playback file $120_{1-n}$ may be associated with nostalgia playback mode and may include numerous uploaded media components $130_{1-n}$ encompassing photographs, voice recordings, moving video images, and/or other files familiar to the user and related to interest items $106_{1-n}$ associated with meaningful events such as vacations, weddings, birthdays, gifts, souvenirs, or special people, places, or things. By way of limited example, the media components $130_{1-n}$ forming playback file $120_2$ associated with stuffed bear $102_2$ of FIG. 3B, discussed above, might include one or more photographs recollecting the vacation during which bear $102_2$ was purchased, a video showing a child receiving and unwrapping bear $102_2$, a scanned ticket stub reflecting entrance into an amusement park where bear $102_2$ originated, and/or a voice recording captured on the date bear $102_2$ was purchased or received or otherwise relating to or describing bear $102_2$. Thus, after scanning stuffed bear $102_2$ with, for example, a smartphone tag scanner 110, playback application 116 may query playback database 118 for tag ID $106_2$, whereupon playback file $120_2$ associated with tag ID $106_2$ may be provided to playback application 116 for display to the user, thereby enhancing a personal memory of the user. While discussed in the context of a personal item and familial memories, nostalgia playback mode may be useful in conveying contextual information relating to any appropriate interest item $102_{1-n}$. By way of additional example, electronic tags 104/memory stones 108 may be associated with items on display within a museum exhibit. When scanned with mobile communications device(s) 112, application 116 may display a playback file $120_{1-n}$ presenting historical, statistical, and/or scientific documents, photographs, videos, and so on.

In another embodiment, playback file $120_{1-n}$ may be associated with reminder mode and may include uploaded media components $130_{1-n}$ encompassing photographs, voice recordings, videos, and/or other files that, when tag scanner 110 identifies tag ID $106_{1-n}$ and playback application 116 is activated to display playback file $120_{1-n}$ upon GUI 128, playback file $120_{1-n}$ presents the user with reminders regarding an upcoming event or task. For example, the media components forming the playback file $120_3$ associated with framed picture $102_3$ (FIG. 3C) might include a PDF or data file of a chore list that includes dusting household decorations before an upcoming dinner party to be held the following week.

Figure 6:
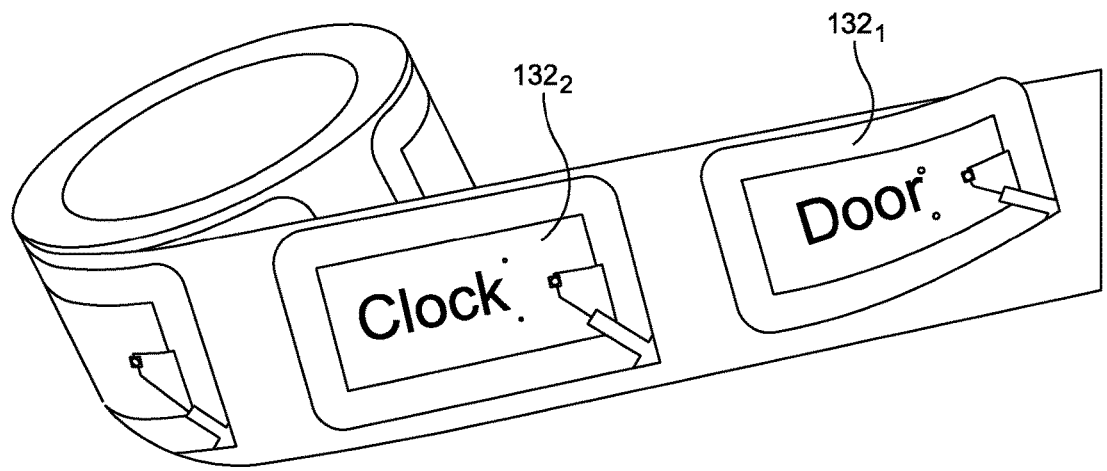
FIG. 6 illustrates one embodiment of a roll of pre-labeled RFID sticker tags for use with the electronic tagging and playback system of FIG. 1 in a language-learning mode.
Figure 7:
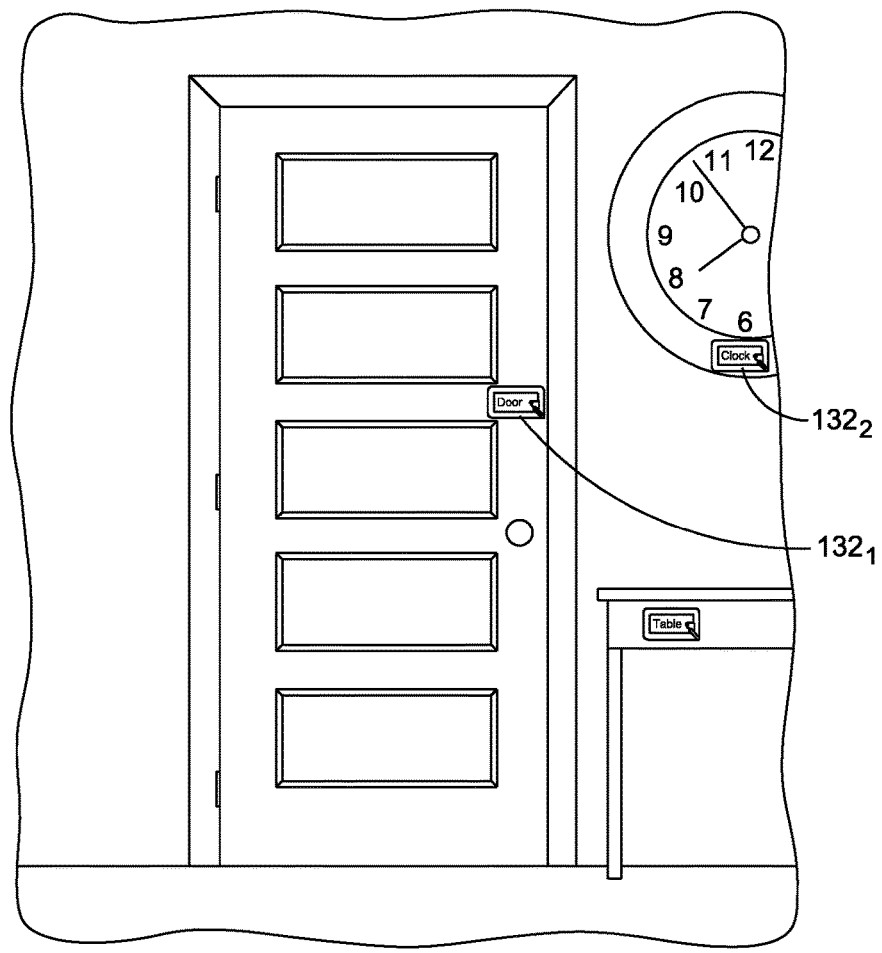
FIG. 7 illustrates an exemplary use/tagging alternative for the RFID sticker tags of FIG. 6.
Figure 8:
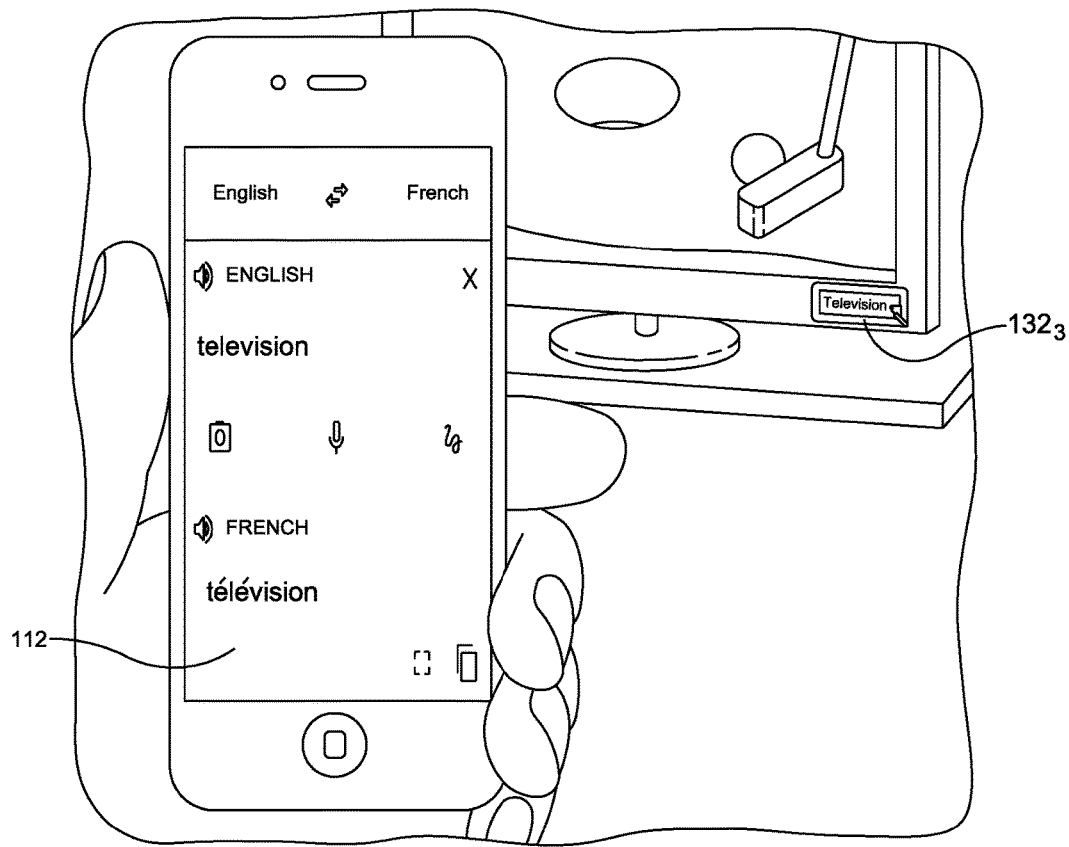
FIG. 8 illustrates one embodiment of a graphical user interface for accessing a playback application of the tagging and playback system of FIG. 1 in a visual language-learning playback mode.
Figure 9:
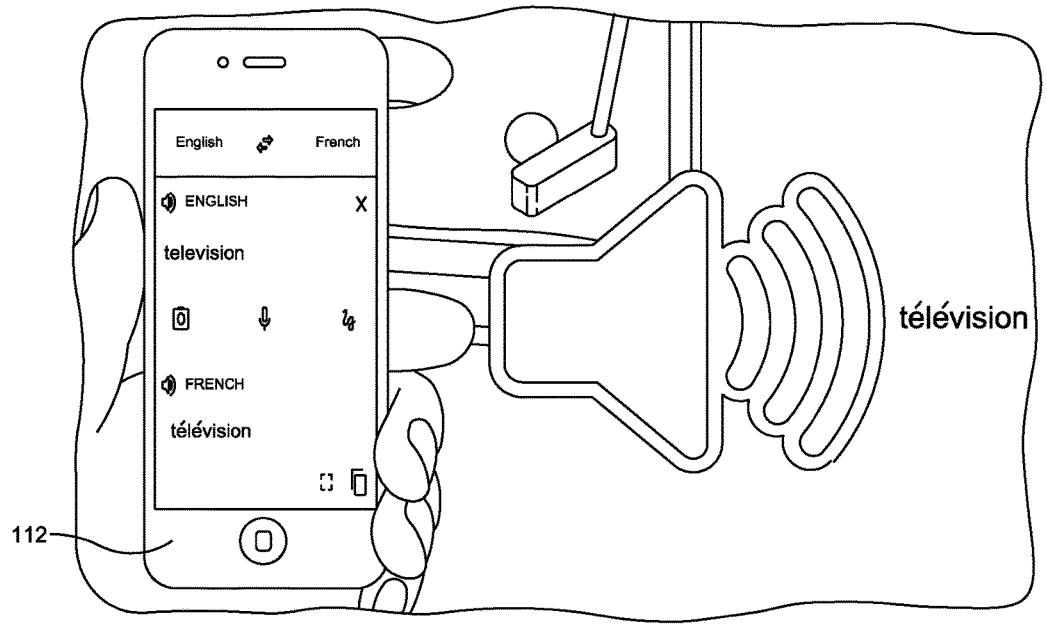
FIG. 9 illustrates the graphical user interface of FIG. 8, in an audible language-learning playback mode.

Alternatively, playback file $120_{1-n}$ may be associated with language-learning playback mode and may contain media components $130_{1-n}$ encompassing display and/or audio files that recite the name of the interest item $102_{1-n}$ associated with playback file $120_{1-n}$, either in English (e.g., for young toddlers learning to speak) or in one or more select foreign languages (e.g., to aid in learning an alternate language). In this embodiment, electronic tag 104 may take the form of a labeled RFID sticker. The RFID stickers may include labels reflecting a number of interest items $102_{1-n}$ to be tagged. For example, and as shown in FIGS. 6-7, a number of RFID stickers $132_{1-n}$ may feature labels associated with interest items (e.g., table, door, clock) for application within a household, an office, or any other locale. RFID stickers $132_{1-n}$ may be blank, pre-labeled, or they may be custom printed or self-labeled using a pen or another marking tool. To compliment RFID stickers $132_{1-n}$, playback application 116 may either incorporate a number of translation modules 134 (FIG. 5) or leverage a plug-in or add-on application configured to add language translation functions to playback application 116. In this regard, playback files $120_{1-n}$ associated with language-learning mode may contain audio files for all or most of interest items $102_{1-n}$ tagged by the user. The user may then select a specific language to be learned (e.g., English for a toddler, French for a college student, Russian for a world traveler), and when tag scanner 110 identifies tag ID $106_{1-n}$, which triggers playback application 116 to display the associated playback file $120_{1-n}$ upon GUI 128, playback file $120_{1-n}$ presents the user with visual translations and/or audio recordings of the translated descriptions of tagged items $102_{1-n}$. For instance, as shown in FIGS. 8-9, when communication device 112 is placed within proximity zone 114 of RFID sticker $132_3$, attached to a television, playback application 116 may be triggered to display an associated playback file that includes a visual translation of the English word "television" into French, along with an audio recording pronouncing the French translation. Thus, in use, the user may walk through a room holding mobile communications device 112 (e.g., a smartphone) upon which playback application 116 has been installed. The user may use tag scanner 110 of device 112 to scan labeled stickers $132_{1-n}$, while contemporaneously receiving a visual and/or audio translation of the labels.

Notably, multiple playback files $120_{1-n}$ may be associated with each of interest items $102_{1-n}$. When multiple playback files $120_{1-n}$ have been created, playback application 116 may allow the user to select which of multiple playback files $120_{1-n}$ are to be played back upon detecting the associated tag IDs $106_{1-n}$. For example, memory stone 108 may be applied to stuffed bear $102_2$ (FIG. 3B), discussed above. In turn, memory stone 108 may store wirelessly accessible tag ID $106_2$, and tag ID $106_2$ may be associated with three different playback files $120_{1-n}$ stored in playback database 118. Each of the playback files may have a different designated playback mode and may include different media components $130_{1-n}$. For example, the first playback file may be designated "nostalgia mode" and contain media components such as photographic and video memorabilia reminiscent of the bear's origin and history. The second playback file may be designated "reminder mode" and include a note/data file instructing the user to take the bear to the cleaners. The third playback file may be designated "language-learning mode" and include a visual and audio translation of the interest item description into a select foreign language (e.g., French "ours en peluche" for English "teddy bear"). In addition to multiple playback files $120_{1-n}$ per interest item $102_{1-n}$, it should be understood that numerous modes beyond nostalgia, reminder, and language-learning modes are contemplated. Playback system 100 may be used to track, store, and chronicle an array of files that are associated with a user or users' items of interest for a wide variety of playback purposes/modes.

Beyond the playback modes discussed above, scanner 110 and playback application 116 may selectively operate in discrete or continuous detection modes. In discrete detection mode, the user must initiate each scan via GUI 118 of application 116. Upon initiation, scanner 110 may read the tag 104 within its proximity zone 114 and display the associated playback file $120_{1-n}$. Alternatively, tag scanner 110 may be activated in a continuous detection mode while passing within the proximity zone 114 of more than one interest item $102_{1-n}$ for automatically playing back multiple playback files $120_{1-n}$. In one embodiment, the display of a first playback file may be modified if a second item tag ID is retrieved by tag scanner 110 before the first playback file is completed. For example, the playback of the first file may be truncated, faded, or blended into the second playback file in order to keep up with a rate at which the user is passing tagged interest items $106_{1-n}$. In one example, a user could set system 100 to operate in language-learning playback mode and continuous detection mode. The user could then walk through a room containing a number of electronic tags 104, or labeled RFID stickers $132_{1-n}$, and upon reaching each tagged interest item $102_{1-n}$, mobile communications device 112 would provide a visual and/or audible translation for the user.

Figure 10:
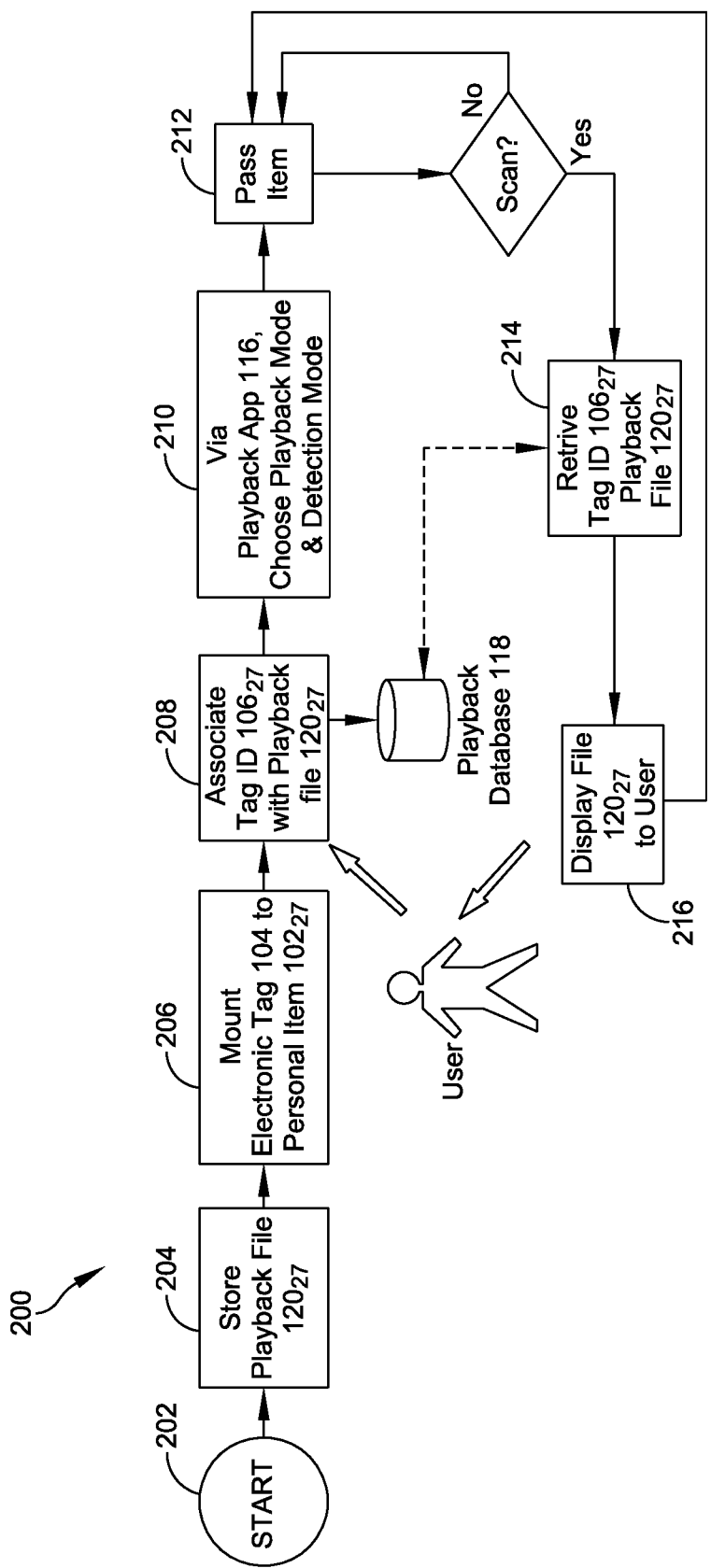
FIG. 10 provides a flowchart depicting an exemplary method of using the electronic tagging and playback system of FIG. 1.
Figure 11:
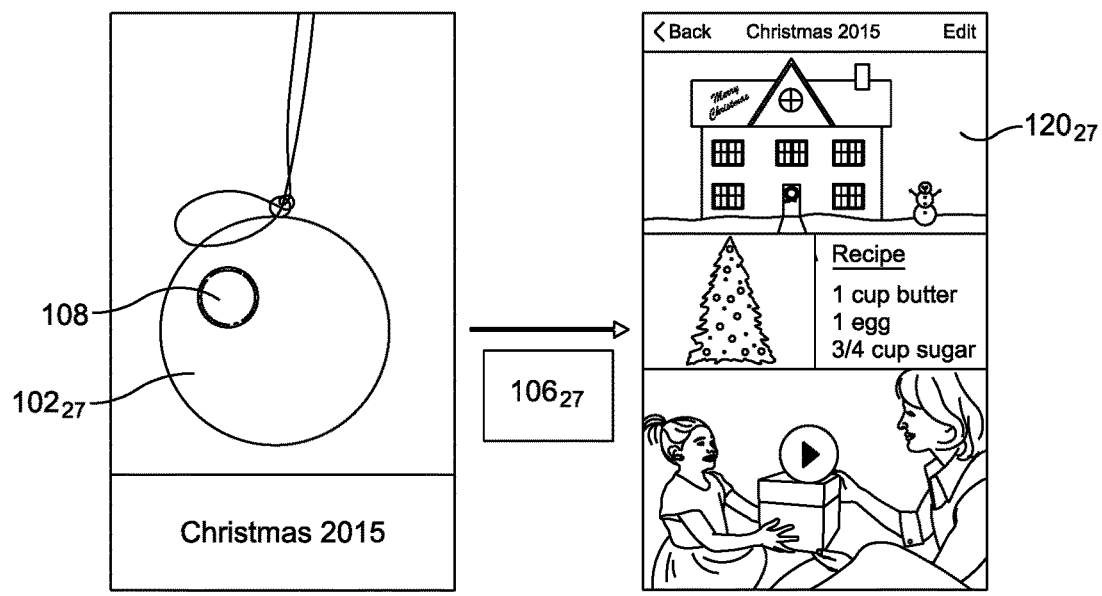
FIG. 11 illustrates accessing a playback file associated with a memory stone attached to an interest item via one embodiment of a graphical user interface of the playback application of FIG. 1 in a nostalgia playback mode.
Figure 12:
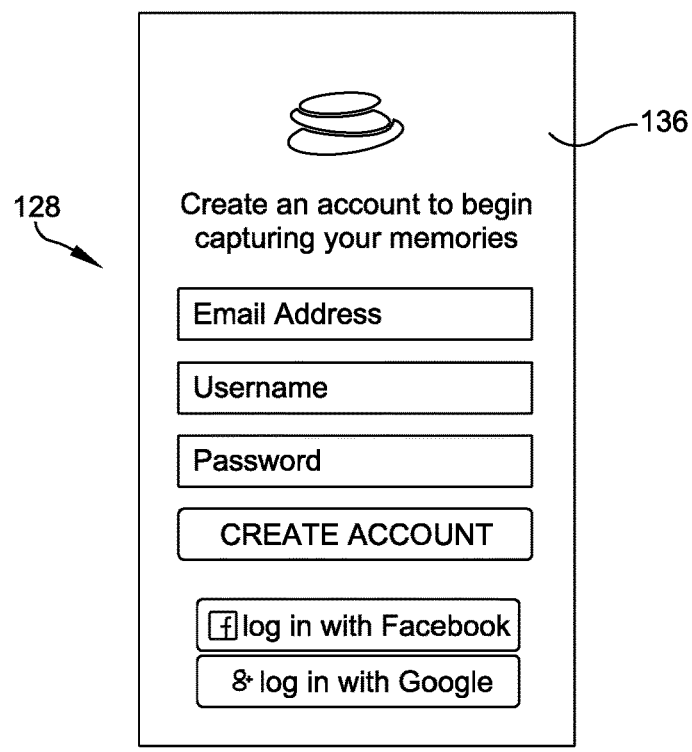
FIG. 12 illustrates accessing one embodiment of a login screen of a graphical user interface of the playback application of FIG. 1 to create an account.

FIG. 10 provides a flowchart detailing an exemplary method 200 of utilizing personal tagging and playback system 100. In this example, and as shown in FIG. 11, system 200 may be set to operate in nostalgia playback mode to store and retrieve a memory-based playback file $120_{27}$ associated with a tag ID $106_{27}$ assigned to a memory stone 108 attached to a Christmas ornament $102_{27}$. Method 200 may start with the creation of an account for a new user (202). As shown in FIG. 12, the user may access a login screen 136 through GUI 128 of playback application 116 that allows a new user to create an account and log in to application 116. The user may leverage login information from third-party social media platforms such as, for example, Facebook or Google+ in creating the account.

Figure 13:
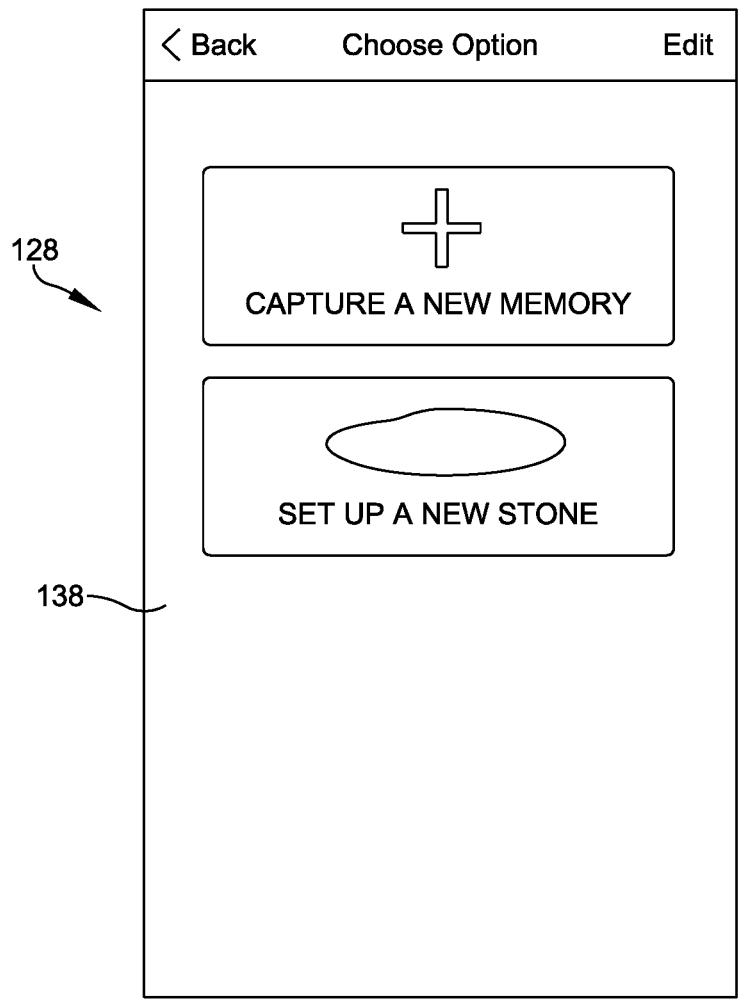
FIG. 13 illustrates accessing one embodiment of an option screen of a graphical user interface of the playback application of FIG. 1 to initiate capturing a new memory (i.e., creating the playback file of FIG. 11) or setting up a new memory stone (i.e., associating the playback file of FIG. 11 with the memory stone of FIG. 11)
Figure 14:
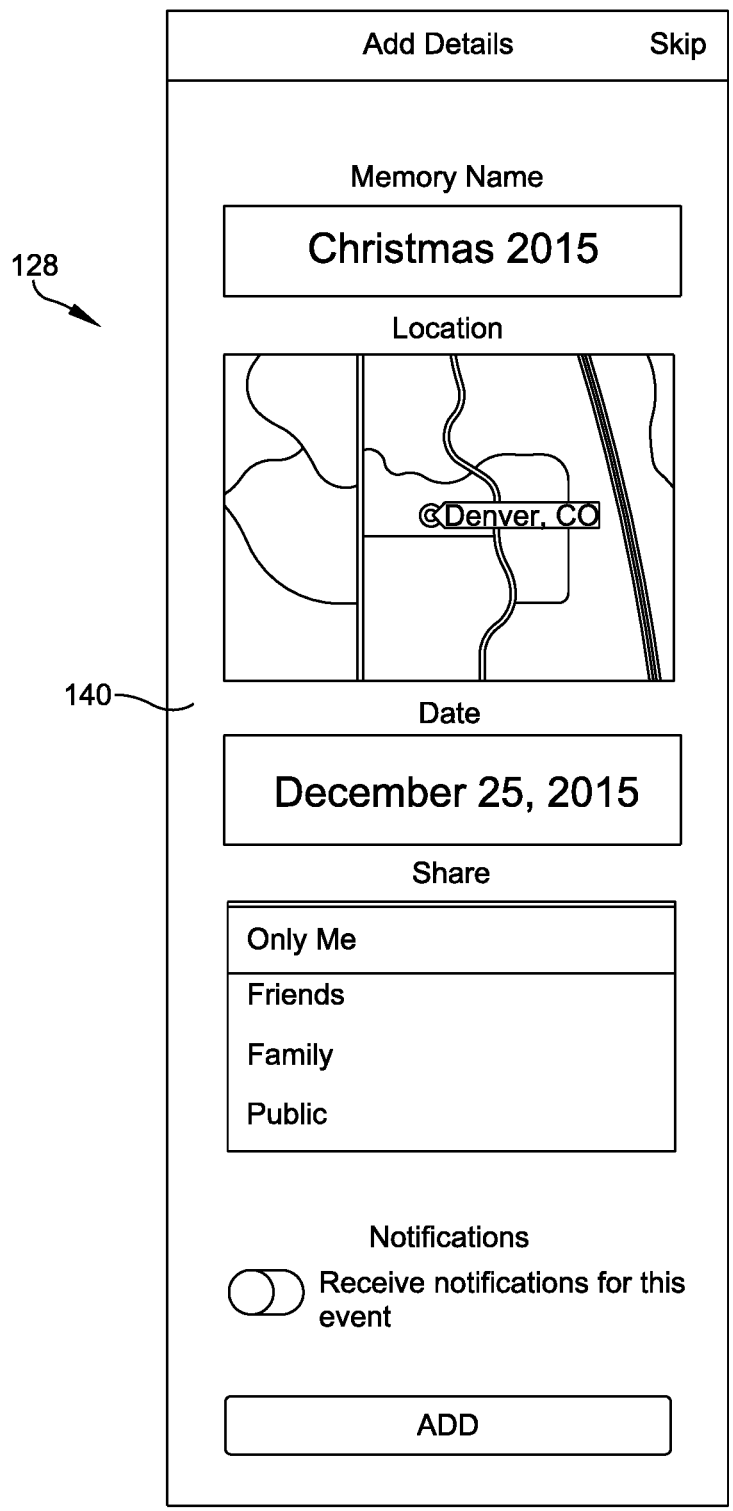
FIG. 14 illustrates accessing one embodiment of a detail screen of a graphical user interface of the playback application of FIG. 1 to add details regarding the stored playback file of FIG. 11.

Once the account is created and the user has logged in, the user may store playback file $120_{27}$ in database 118 (204) for later retrieval. FIG. 13 provides a screenshot of one embodiment of an option screen 138 presented by GUI 128. The user may select "capture a new memory" to begin the process of storing playback file $120_{27}$ (204). Initially, the user may interact with a detail screen 140, shown in FIG. 14, to designate a name for memory/playback file $120_{27}$, a date associated with playback file $120_{27}$, as well as specify notification preferences and others with whom the file may be shared. In this embodiment, memory/playback file $120_{27}$ is named "Christmas 2015" and associated with the date Dec. 25, 2015.

Figure 15:
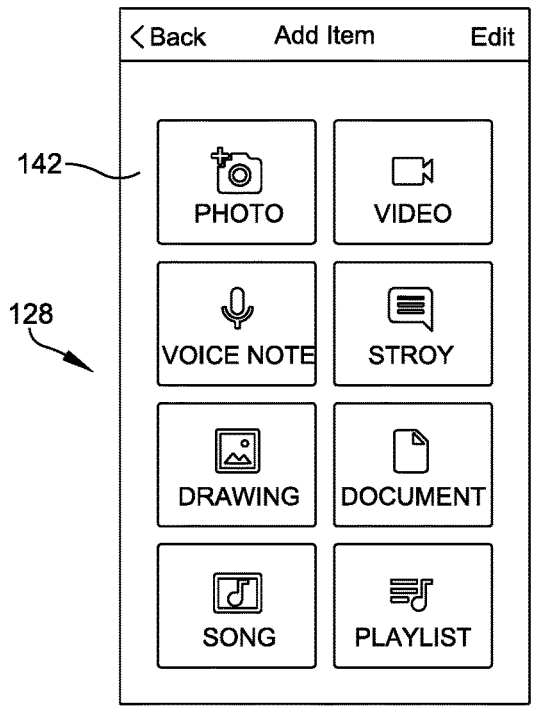
FIG. 15 illustrates accessing one embodiment of an add-item screen of a graphical user interface of the playback application of FIG. 1 to add media components to the stored playback file of FIG. 11.
Figure 16:
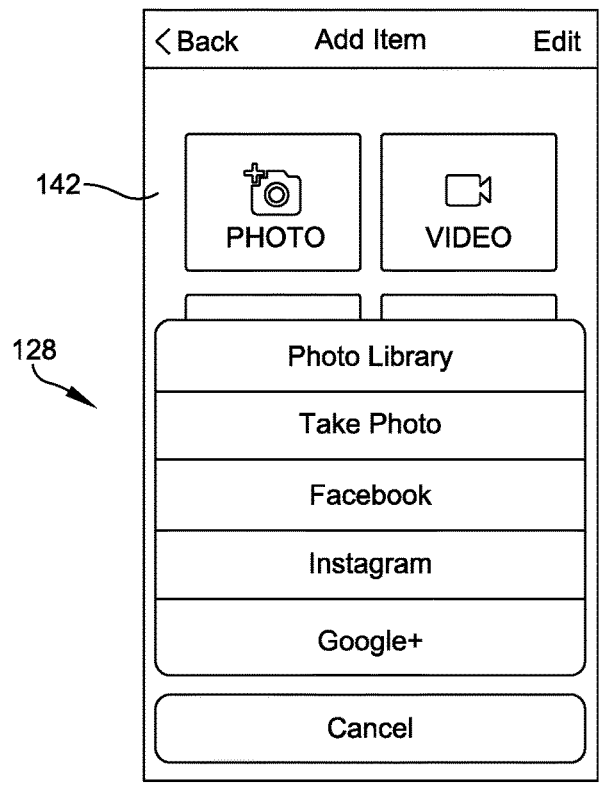
FIG. 16 illustrates accessing one embodiment of an add-item screen of a graphical user interface of the playback application of FIG. 1 to add photo-related media components to the stored playback file of FIG. 11.
Figure 17:
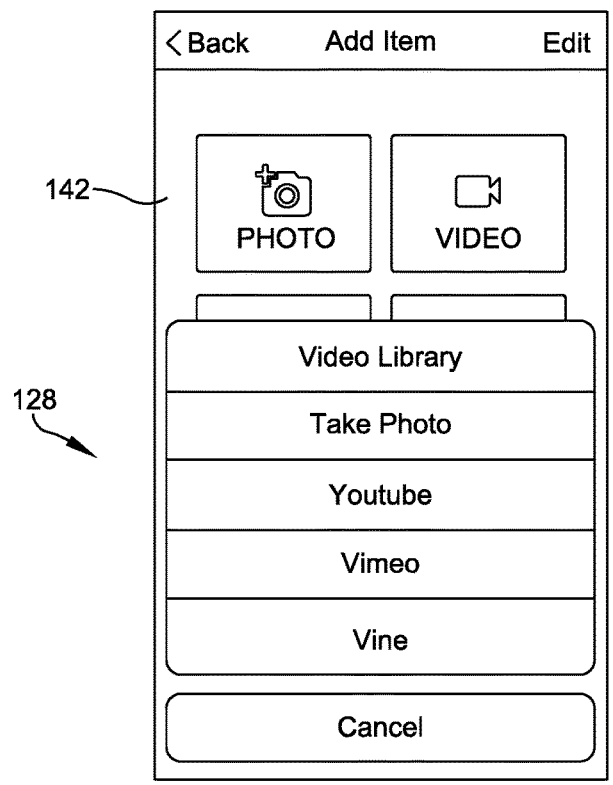
FIG. 17 illustrates accessing one embodiment of an add-item screen of a graphical user interface of the playback application of FIG. 1 to add video-related media components to the stored playback file of FIG. 11.
Figure 18:
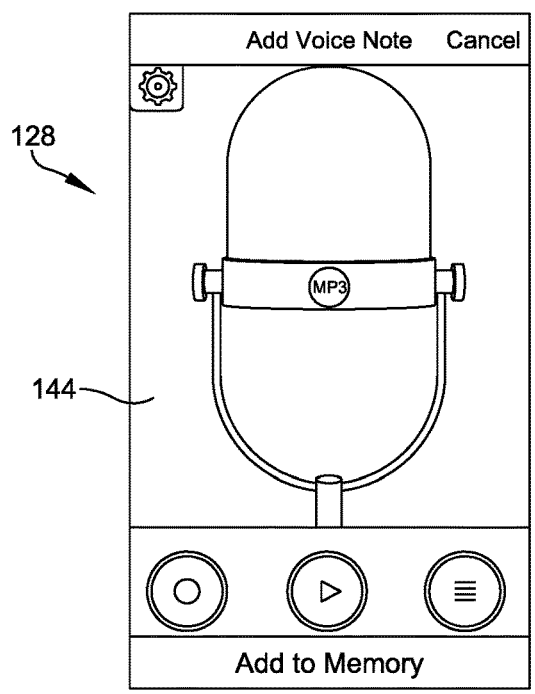
FIG. 18 illustrates accessing one embodiment of a microphone feature of a graphical user interface of the playback application of FIG. 1 to add voice-recording-related media components to the stored playback file of FIG. 11.

FIGS. 15-17 illustrate embodiments of an add-item screen 142 that facilitates the addition of media components $130_{1-n}$ to playback file $120_{27}$ (FIG. 1). Using add-item screen 142, the user may load media components $130_{1-n}$ including photo files, video files, voice notes, descriptive stories, drawing files, music files, playlists, and/or other documents or display files stored upon, captured by, or accessible to mobile communications device 112. Media components $130_{1-n}$ may originate at and be loaded from a variety sources. For example, FIG. 16 shows that photo files may be loaded directly from a camera on the mobile communications device 112, from a photo library, or from a number of third-party social media platforms such as Facebook, Instagram, and/or Google+. Similarly, as shown in FIG. 17, video files may be loaded directly from the device's video recorder, a video library, or a third-party video application such as YouTube, Vimeo, and/or Vine. FIG. 18 shows that voice notes may be recorded directly through playback application 116 using a microphone feature 144 of device 112.

In sum, system 100 may receive and store any type of appropriate file, either captured by mobile communications device 112 or captured remotely and made accessible to device 112. Ultimately, and in the embodiment shown in FIG. 11, playback file $120_{27}$ may include a number of photos captured on Christmas Day 2015, a video of family and friends opening gifts, and a notes file containing a holiday cookie recipe.

Figure 19:
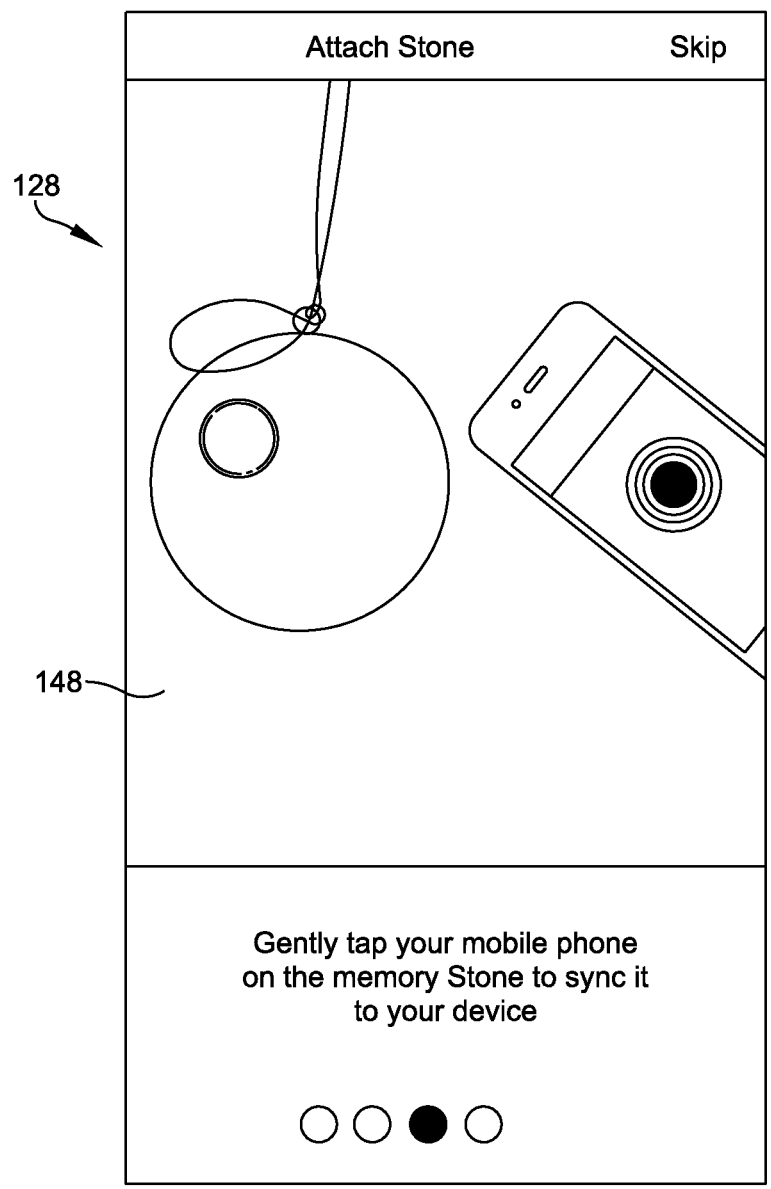
FIG. 19 illustrates accessing one embodiment of an attach-stone screen of a graphical user interface of the playback application of FIG. 1 to associate the memory stone of FIG. 11 with the playback file of FIG. 11.

Returning to FIG. 10, once playback file $120_{27}$ has been stored in playback database 118, the user may attach an electronic tag 104 to the interest item, or, in this embodiment, to ornament $102_{27}$ (206). Electronic tag 104 may take the form of memory stone 108 or any other electronic tag 104. In one embodiment, the user may associate a tag ID $106_{27}$ of the tag 104 with the stored playback file $120_{27}$ (208) by accessing an attach-stone screen 148 within application 116 and placing tag scanner 110 of mobile communications device 112 within proximity zone 114 of ornament $102_{27}$ (e.g., tapping device 112 upon memory stone 108 attached to ornament $102_{27}$), as shown in FIG. 19.

To view playback file $120_{27}$, the user may employ playback application 116 to choose a playback mode (e.g., nostalgia playback mode) as well as a detection mode (e.g., discrete detection mode) (210) before passing tag scanner 110 near the interest item, or the ornament $102_{27}$, within proximity zone 114 (212). When passed within proximity zone 114, tag scanner 110 may scan or read electronic tag 104 to identify tag ID $106_{27}$ according to the standards of the electronic tag (e.g., RFID standards) and automatically retrieve corresponding playback file $120_{27}$ from playback database 118 (214) before displaying playback file $106_{27}$ (FIG. 11) to the user via GUI 128 of application 116 (216), as shown in FIG. 11. By scanning electronic tag 104, the user may view all the media components $130_{1-n}$—the pictures, the video, and the recipe—of playback file $120_{27}$ and associated with ornament $102_{27}$ and Christmas 2015. In addition to displaying playback file $120_{27}$ upon GUI 128 of application 116 on mobile communications device 112, application 116 may, at the user's election, project playback file $120_{27}$ for display upon other integrated smart devices such as, for example, an iPad, tablet computer, or smart TV 146, as shown in FIG. 1.

While in this embodiment method 200 is described in terms of personal interest item $102_{27}$ designated for nostalgia playback mode and discrete detection mode, method 200 may apply to a wide range of interest items in different playback modes (e.g., nostalgia, reminder, language-learning) and may also apply in continuous or discrete detection mode. Electronic tagging and playback system 100 may be used to tag virtually any object and store a playback file composed of media components associated with that object for later retrieval and display to a user. System use may extend to personal interest items, commercial or business interest items, stationary interest items and mobile interest items, all tagged to convey a wide variety of desired information about the object via the associated playback files.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. An electronic tagging and playback system for displaying playback files associated with tagged interest items, comprising:
   an electronic tag storing a wirelessly accessible tag ID and disposed upon at least one physical interest item of a user;
   a communications device having a tag scanner associated with a playback application that is activatable by the user for retrieving the tag ID when the tag scanner is within a proximity zone of the electronic tag, the playback application comprising a graphical user interface (GUI) having a capture architecture presenting a number of pre-configured screens on the GUI that guide the user in generating and storing a playback file associated with the tag ID, the playback file comprising at least two media components including at least one new user-generated media component not previously stored on the communications device or any other device; and
   a playback database communicatively linked to the playback application and storing the playback file associated with the tag ID, wherein:
      the playback file is uploaded to the playback database by the user via the playback application; and
      the playback file is displayed by the communications device when the playback application is activated and after the tag ID has been retrieved.

2. The electronic tagging and playback system of claim 1, wherein:
the electronic tag is an RFID tag; and
the tag scanner contains an RFID reader for reading the RFID tag.

3. The electronic tagging and playback system of claim 2, wherein the RFID tag is passive.

4. The electronic tagging and playback system of claim 2, wherein the RFID tag comprises a three-dimensional memory stone configured for attachment to a non-visible portion of the interest item.

5. The electronic tagging and playback system of claim 1, wherein:
   the electronic tag is a near-field communications (NFC) tag; and
   the tag scanner contains a NFC reader for reading the NFC tag.

6. The electronic tagging and playback system of claim 1, wherein:
   the electronic tag is a bar code or a QR code; and
   the tag scanner contains a bar code reader or a QR code reader for reading the bar code or the QR code, respectively.

7. The electronic tagging and playback system of claim 1, wherein the playback application is a mobile application installed on the communications device.

8. The electronic tagging and playback system of claim 7, wherein the communications device is a smartphone.

9. The electronic tagging and playback system of claim 1, wherein the media components comprise one or more of an audio file, a video file, a PDF file, and a data file related to the interest item, and the at least one new user-generated media component comprises one of a photo captured by the user, a video captured by the user, and a data file generated by the user.

10. The electronic tagging and playback system of claim 1, wherein:
   the playback application is communicatively coupled with at least one language-translation module; and
   the media components comprise one or more of an audio file and a display file containing a select-language translation for the interest item.

11. The electronic tagging and playback system of claim 1, wherein the playback database is stored in the communications device or in a cloud-based storage system accessible via at least one communication channel.

12. The electronic tagging and playback system of claim 1, further comprising a second playback file associated with the tag ID, wherein the playback application is configured to allow the user to select which one of the playback file and the second playback file is displayed upon retrieving the tag ID.

13. The electronic tagging and playback system of claim 1, wherein the playback application comprises a continuous detection mode in which the tag scanner continuously retrieves additional tag IDs stored in additional electronic tags entering the proximity zone for automatic display of additional playback files associated with the additional tag IDs.

14. A method for displaying information associated with tagged items of interest, comprising:
   disposing, upon a physical interest item of a user, an electronic tag having a wirelessly accessible tag ID stored within the electronic tag;
   initiating a playback application installed upon a communications device, the playback application in communication with a tag scanner configured to activate the electronic tag within a proximity zone of the tag scanner, the playback application comprising a graphical user interface (GUI) having a capture architecture presenting a number of pre-configured screens on the GUI that guide a user in generating and storing a playback file associated with the tag ID;
   using the pre-configured screens of the capture architecture of the playback application, generating a least one new media component not previously stored on the communications device or any other device;
   using the playback application, storing a playback file in a playback database in communication with the playback application, the playback file associated with the tag ID and including the at least one new media component generated via the pre-configured screens of the capture architecture of the playback application;
   activating the tag scanner;
   retrieving the tag ID from the electronic tag;
   receiving, from the playback database, the playback file; and
   displaying, via the GUI of the playback application, the playback file to the user.

15. The method of claim 14,
wherein the at least one new media component comprises one of an audio file, a video file, a PDF file, and a data file.

16. The method of claim 15, wherein the audio file comprises a select-language translation for the physical interest item.

17. The method of claim 14, wherein the electronic tag is a three-dimensional RFID tag configured for placement on a visual portion or a non-visual portion of the physical interest item.

18. The method of claim 14, further comprising:
storing a second playback file in the playback database, the second playback file associated with the tag ID; and
selecting, after the activating the tag scanner and the retrieving the tag ID from the electronic tag, one of the playback file and the second playback file for display.

19. A method for displaying information associated with items of interest to a user, comprising:
generating, using a playback application operating upon a user communications device having a tag scanner, at least one new media component not previously stored on the communications device or any other device;
storing, within a playback database in communication with the playback application installed upon the user communications device, a playback file including the at least one new media component, the playback file associated with a wirelessly accessible tag ID stored on an RFID tag, the RFID tag attached to a physical user interest item, the playback application comprising a graphical user interface (GUI) having a capture architecture presenting a number of pre-configured screens on the GUI that guide the user in the generating the at least one new media component and the storing the playback file associated with the tag ID;
detecting, via the tag scanner when the tag scanner and the RFID tag are both located within a proximity zone, the tag ID stored on the RFID tag;
in response to the detecting, retrieving the playback file from the playback database; and
displaying, via the GUI of the playback application, the playback file to the user.

20. The method of claim 19, wherein the RFID tag comprises a three-dimensional memory stone configured for attachment to the user interest item on a non-visible portion of the user interest item.

* * * * *